(12) United States Patent
Armitage et al.

(10) Patent No.: US 11,358,127 B2
(45) Date of Patent: Jun. 14, 2022

(54) $NO_x$ ADSORBER CATALYST

(71) Applicant: Johnson Matthey Public Limited Company, London (GB)

(72) Inventors: Andrew Paul Armitage, Royston (GB);
Desiree Duran-Martin, Reading (GB);
Paul James Millington, Reading (GB);
Paul Richard Phillips, Royston (GB);
Raj Rao Rajaram, Reading (GB);
Stuart David Reid, Royston (GB);
Daniel Swallow, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/586,491

(22) Filed: May 4, 2017

(65) Prior Publication Data
US 2017/0320046 A1    Nov. 9, 2017

(51) Int. Cl.
*B01J 23/10*       (2006.01)
*B01J 23/63*       (2006.01)
(Continued)

(52) U.S. Cl.
CPC .......... *B01J 23/63* (2013.01); *B01D 53/9422* (2013.01); *B01D 53/9468* (2013.01); *B01D 53/9472* (2013.01); *B01J 23/005* (2013.01); *B01J 35/04* (2013.01); *B01J 37/0045* (2013.01); *B01J 37/0234* (2013.01); *B01J 37/0248* (2013.01); *F01N 3/0814* (2013.01);
(Continued)

(58) Field of Classification Search
CPC .......... B01J 23/63; B01J 35/04; B01J 23/005; F01N 3/0814; F01N 2570/14; B01D 53/9472; B01D 53/9468; B01D 2255/1023; B01D 2255/91; B01D 2255/1021; B01D 2255/903; B01D 2255/902; B01D 2255/915; B01D 2255/1025; B28B 2003/203; B28B 3/20
USPC ........................................................ 502/304
See application file for complete search history.

(56) References Cited

U.S. PATENT DOCUMENTS 5,248,650 A    9/1993  Sekiba et al.
5,656,244 A    8/1997  Cole
(Continued)

FOREIGN PATENT DOCUMENTS

CA    2280631        2/2000
CN    102209587 A   10/2011
(Continued)

OTHER PUBLICATIONS

Sharma et al.; A spray drying system for synthesis of rare-earth doped cerium oxide nanoparticles; Chemical Physics Letters 495 (2010) 280-286.
(Continued)

*Primary Examiner* — Haytham Soliman

(57) ABSTRACT

A $NO_x$ adsorber catalyst and its use in an emission treatment system for internal combustion engines, is disclosed. The $NO_x$ adsorber catalyst composition comprises a support material, one or more platinum group metals disposed on the support material, and a $NO_x$ storage material.

11 Claims, 1 Drawing Sheet

(51) Int. Cl.

| | | |
|---|---|---|
| *B01D 53/94* | (2006.01) | |
| *B01J 37/02* | (2006.01) | |
| *B01J 37/00* | (2006.01) | |
| *B01J 23/00* | (2006.01) | |
| *B01J 35/04* | (2006.01) | |
| *F01N 3/08* | (2006.01) | |
| *B28B 3/20* | (2006.01) | |

(52) U.S. Cl.
CPC ............ *B01D 2255/1021* (2013.01); *B01D 2255/1023* (2013.01); *B01D 2255/1025* (2013.01); *B01D 2255/2042* (2013.01); *B01D 2255/2047* (2013.01); *B01D 2255/2065* (2013.01); *B01D 2255/2068* (2013.01); *B01D 2255/2092* (2013.01); *B01D 2255/40* (2013.01); *B01D 2255/902* (2013.01); *B01D 2255/903* (2013.01); *B01D 2255/9022* (2013.01); *B01D 2255/91* (2013.01); *B01D 2255/915* (2013.01); *B01D 2258/012* (2013.01); *B01J 23/10* (2013.01); *B01J 2523/00* (2013.01); *B28B 3/20* (2013.01); *B28B 2003/203* (2013.01); *F01N 2570/14* (2013.01); *Y02T 10/12* (2013.01)

(56) References Cited

U.S. PATENT DOCUMENTS

| | | | |
|---|---|---|---|
| 5,753,582 A | 5/1998 | Garcin et al. | |
| 5,800,793 A | 9/1998 | Cole | |
| 6,350,421 B1* | 2/2002 | Strehlau | B01D 53/9422 423/213.2 |
| 7,550,124 B2* | 6/2009 | Chen | B01D 53/945 423/213.2 |
| 2008/0044329 A1 | 2/2008 | Chen et al. | |
| 2008/0120970 A1 | 5/2008 | Hilgendorff et al. | |
| 2009/0099005 A1 | 4/2009 | Aono et al. | |
| 2009/0143221 A1* | 6/2009 | Ogunwumi | B01D 53/944 502/67 |
| 2011/0154807 A1 | 6/2011 | Chandler et al. | |
| 2011/0203264 A1 | 8/2011 | Saraha | |
| 2011/0287928 A1 | 11/2011 | Nakatsuji et al. | |
| 2012/0055142 A1* | 3/2012 | Hilgendorff | B01D 53/945 60/301 |
| 2013/0336865 A1 | 12/2013 | Brisley et al. | |
| 2014/0148610 A1 | 5/2014 | Brazdil, Jr. et al. | |
| 2014/0301907 A1* | 10/2014 | Sahara | B01D 53/9422 422/171 |

FOREIGN PATENT DOCUMENTS

| | | |
|---|---|---|
| DE | 102011012799 A1 | 3/2012 |
| DE | 2013218234 A1 | 3/2015 |
| EP | 0982066 A1 | 3/2000 |
| EP | 1027919 A2 | 8/2000 |
| EP | 1797945 A1 | 6/2007 |
| EP | 2322274 A1 | 5/2011 |
| JP | 35261283 A | 10/1993 |
| JP | 2010510884 A | 4/2010 |
| WO | 199813139 A1 | 4/1998 |
| WO | 199845026 A1 | 10/1998 |
| WO | 200240139 A1 | 5/2002 |
| WO | 2004076829 A1 | 9/2004 |
| WO | 2005092481 A1 | 10/2005 |
| WO | 2008047170 A1 | 4/2008 |
| WO | 2008067375 A1 | 6/2008 |
| WO | 2010053163 A1 | 5/2010 |
| WO | 2012085564 A1 | 6/2012 |
| WO | 2013007809 A1 | 1/2013 |
| WO | 2015085300 A1 | 6/2015 |
| WO | 2017061234 A1 | 4/2017 |

OTHER PUBLICATIONS

Sharma et al.; A spray drying system for synthesis of rare-earth doped cerium oxide nanoparticles; Chemical Physics Letters, vol. 495, Issues 4-6, Aug. 10, 2010, pp. 280-286.

* cited by examiner

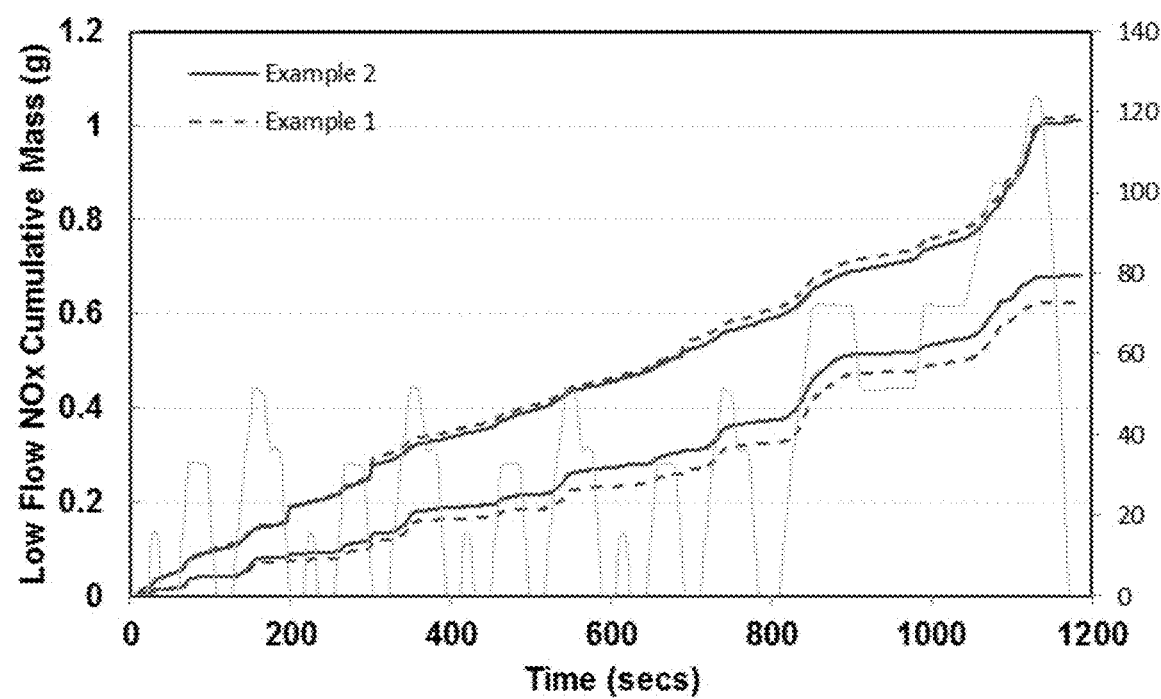

$NO_x$ ADSORBER CATALYST

FIELD OF THE INVENTION

The invention relates to a $NO_x$ adsorber catalyst comprising a composition comprising a neodymium-containing component, a method of making the neodymium-containing component, and emission systems for lean-burn engines comprising the NOx adsorber catalyst.

BACKGROUND OF THE INVENTION

Internal combustion engines produce exhaust gases containing a variety of pollutants, including nitrogen oxides ("$NO_x$"), carbon monoxide, and uncombusted hydrocarbons, which are the subject of governmental legislation. Increasingly stringent national and regional legislation has lowered the amount of pollutants that can be emitted from such diesel or gasoline engines. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

One exhaust gas treatment component utilized to clean exhaust gas is the $NO_x$ adsorber catalyst (or "$NO_x$ trap"). $NO_x$ adsorber catalysts are devices that adsorb $NO_x$ under lean exhaust conditions, release the adsorbed $NO_x$ under rich conditions, and reduce the released $NO_x$ to form $N_2$. A $NO_x$ adsorber catalyst typically includes a $NO_x$ adsorbent for the storage of $NO_x$ and an oxidation/reduction catalyst.

The $NO_x$ adsorbent component is typically an alkaline earth metal, an alkali metal, a rare earth metal, or combinations thereof. These metals are typically found in the form of oxides. The oxidation/reduction catalyst is typically one or more noble metals, preferably platinum, palladium, and/or rhodium. Typically, platinum is included to perform the oxidation function and rhodium is included to perform the reduction function. The oxidation/reduction catalyst and the $NO_x$ adsorbent are typically loaded on a support material such as an inorganic oxide for use in the exhaust system.

The $NO_x$ adsorber catalyst performs three functions. First, nitric oxide reacts with oxygen to produce $NO_2$ in the presence of the oxidation catalyst. Second, the $NO_2$ is adsorbed by the $NO_x$ adsorbent in the form of an inorganic nitrate (for example, BaO or $BaCO_3$ is converted to $Ba(NO_3)_2$ on the $NO_x$ adsorbent). Lastly, when the engine runs under rich conditions, the stored inorganic nitrates decompose to form NO or $NO_2$ which are then reduced to form $N_2$ by reaction with carbon monoxide, hydrogen and/or hydrocarbons (or via $NH_x$ or NCO intermediates) in the presence of the reduction catalyst. Typically, the nitrogen oxides are converted to nitrogen, carbon dioxide and water in the presence of heat, carbon monoxide and hydrocarbons in the exhaust stream.

Typically, $NO_x$ adsorbent materials consist of inorganic oxides such as alumina, silica, ceria, zirconia, titania, or mixed oxides which are coated with at least one platinum group metal. PCT Intl. Appl. WO 2008/047170 discloses a system wherein $NO_x$ from a lean exhaust gas is adsorbed at temperatures below 200° C. and is subsequently thermally desorbed above 200° C. The $NO_x$ adsorbent is taught to consist of palladium and a cerium oxide or a mixed oxide or composite oxide containing cerium and at least one other transition metal.

PCT Intl. Appl. WO 2004/076829 discloses an exhaust-gas purification system which includes a $NO_x$ storage catalyst arranged upstream of an SCR catalyst. The $NO_x$ storage catalyst includes at least one alkali, alkaline earth, or rare earth metal which is coated or activated with at least one platinum group metal (Pt, Pd, Rh, or Ir). A particularly preferred $NO_x$ storage catalyst is taught to include cerium oxide coated with platinum and additionally platinum as an oxidizing catalyst on a support based on aluminium oxide. EP 1027919 discloses a $NO_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

In addition, U.S. Pat. Nos. 5,656,244 and 5,800,793 describe systems combining a $NO_x$ storage/release catalyst with a three way catalyst. The $NO_x$ adsorbent is taught to comprise oxides of chromium, copper, nickel, manganese, molybdenum, or cobalt, in addition to other metals, which are supported on alumina, mullite, cordierite, or silicon carbide.

At low temperatures (typically below about 200° C.), the $NO_x$ storage function of these catalysts is inefficient and continues to be an area of catalyst development in need of improvement. It is also desirable for catalysts to be developed that have little or no $NO_x$ storage properties at greater than a specific temperature, to allow control of when $NO_x$ is released for subsequent conversion by, for example, a further downstream catalyst. The deactivation of $NO_x$ adsorber catalysts by sulfur, which can be present in fuels or engine lubricating oil, is also a problem, particularly under lower temperature conditions at which it may be challenging to thermally desulfate the catalyst.

As with any automotive system and process, it is desirable to attain still further improvements in exhaust gas treatment systems. We have discovered a new $NO_x$ adsorber catalyst composition with improved low temperature $NO_x$ storage characteristics, improved NOx release properties, and improved desulfation properties.

SUMMARY OF THE INVENTION

In a first aspect of the invention there is provided a $NO_x$ adsorber catalyst for treating emissions from a lean burn engine, said $NO_x$ adsorber catalyst comprising a first layer, said first layer comprising a composition comprising: a support material; one or more platinum group metals disposed on the support material; and a $NO_x$ storage material; wherein the support material comprises alumina or a mixed oxide comprising alumina; the one or more platinum group metals comprise a mixture or alloy of platinum and palladium; the $NO_x$ storage material comprises ceria; and the support material or the $NO_x$ storage material comprises a neodymium-containing component.

In a second aspect of the invention there is provided a $NO_x$ adsorber catalyst as hereinbefore defined supported on a metal or ceramic substrate.

In a third aspect of the invention there is provided a $NO_x$ adsorber catalyst as hereinbefore defined, wherein the catalyst composition is extruded to form a flow-through or filter substrate.

In a fourth aspect of the invention there is provided a NOx adsorber catalyst composition comprising a support material, one or more platinum group metals disposed on the support material, and a NOx storage material; wherein the support material or the NOx storage material comprises a neodymium-containing component.

In a fifth aspect of the invention there is provided a $NO_x$ adsorber catalyst comprising the $NO_x$ adsorber catalyst composition as hereinbefore defined supported on a metal or ceramic substrate.

In a sixth aspect of the invention there is provided a $NO_x$ adsorber catalyst comprising the $NO_x$ adsorber catalyst composition as hereinbefore defined, wherein the catalyst composition is extruded to form a flow-through or filter substrate.

In a seventh aspect of the invention there is provided a method of making the $NO_x$ adsorber catalyst composition of as hereinbefore defined, comprising adding one or more precious group metals or precious group metal salts to a support material to form a PGM-support mixture, and adding a $NO_x$ storage material to the PGM-support mixture.

In an eighth aspect of the invention there is provided a method of making a neodymium-containing material, comprising mixing a solution of a neodymium-containing salt with ceria particles, spray-drying the particles, and heating the spray-dried particles.

In a ninth aspect of the invention there is provided a NOx adsorber catalyst for treating emissions from a lean burn engine, said NOx adsorber catalyst comprising a first layer, said first layer comprising a composition comprising: a support material; one or more platinum group metals disposed on the support material; and a NOx storage material; wherein the support material comprises alumina or a mixed oxide comprising alumina; the one or more platinum group metals comprise a mixture or alloy of platinum and palladium; the NOx storage material comprises ceria; and the support material or the NOx storage material is obtainable by the method as hereinbefore defined.

In a tenth aspect of the invention there is provided an emission treatment system for treating a flow of a combustion exhaust gas comprising a lean-burn engine and the $NO_x$ adsorber catalyst as hereinbefore defined; wherein the lean-burn engine is in fluid communication with the $NO_x$ adsorber catalyst.

In an eleventh aspect of the invention there is provided a method of treating an exhaust gas from an internal combustion engine comprising contacting the exhaust gas with the $NO_x$ adsorber catalyst as hereinbefore defined, or the emission treatment system as hereinbefore defined.

BRIEF DESCRIPTION OF THE DRAWINGS

FIG. 1 shows the cumulative $NO_x$ from engine testing with a NOx adsorber catalyst according to the present invention.

DEFINITIONS

The term "washcoat" is well known in the art and refers to an adherent coating that is applied to a substrate, usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "substantially free of" as used herein with reference to a material means that the material in a minor amount, such as ≤5% by weight, preferably ≤2% by weight, more preferably ≤1% by weight. The expression "substantially free of" embraces the expression "does not comprise".

DETAILED DESCRIPTION OF THE INVENTION

The $NO_x$ adsorber catalyst for treating emissions from a lean burn engine of the invention, comprises a first layer, said first layer comprising a composition comprising:
a support material;
one or more platinum group metals disposed on the support material; and
a $NO_x$ storage material;
wherein the support material comprises alumina or a mixed oxide comprising alumina;
the one or more platinum group metals comprise a mixture or alloy of platinum and palladium;
the $NO_x$ storage material comprises ceria; and
the support material or the $NO_x$ storage material comprises a neodymium-containing component.

Another aspect of the invention is a NOx adsorber catalyst composition comprising a support material, one or more platinum group metals disposed on the support material, and a NOx storage material; wherein the support material or the NOx storage material comprises a neodymium-containing component.

The neodymium-containing component can be present in either the support material or the $NO_x$ storage material, or in both. In some embodiments of the invention, the support material and the $NO_x$ storage material are substantially the same component. In other, preferred, embodiments, the support material and the $NO_x$ storage material are different components.

In some embodiments of the invention, the support material consists essentially of, consists of, or is the neodymium-containing component.

In some embodiments of the invention, the $NO_x$ storage material consists essentially of, consists of, or is the neodymium-containing component.

For the avoidance of doubt, in some embodiments of the invention, the neodymium-containing component is the support material. In other embodiments of the invention, the neodymium-containing component is the $NO_x$ storage material. Embodiments may comprise a neodymium-containing support material, a neodymium-containing $NO_x$ storage material, or both a neodymium-containing support material and a neodymium-containing $NO_x$ storage material.

The neodymium-containing component can be any salt, oxide, complex or other compound that contains neodymium, for example neodymium(III) oxide. It may also be neodymium metal. For the avoidance of doubt, this list of possible neodymium-containing components is non-limiting.

The neodymium-containing component may be present on the surface of the support material, on the surface of the $NO_x$ storage material, or on the surface of both. The neodymium-containing component may, additionally or alternatively, be incorporated into the support material, the $NO_x$ storage material, or both. One example of the neodymium-containing component being incorporated into the support material or the $NO_x$ storage material would be the replacement of atoms of the support material or the $NO_x$ storage material by neodymium, e.g. in the lattice structure of either material.

In some embodiments of the invention, the neodymium-containing component is present as a dopant. That is, the invention may comprise a neodymium-doped support material, a neodymium-doped $NO_x$ storage material, or both a neodymium-doped support material and a neodymium-doped $NO_x$ storage material.

The neodymium-containing component present in the compositions of the present invention are advantageous in that they store no, or substantially no, $NO_x$ above a given temperature, such as above 180, 200, 250, or 300° C., preferably above about 300° C. This is advantageous because a rich exhaust stream is therefore not necessary to release and/or convert $NO_x$ under "highway" conditions. This is especially preferable when the $NO_x$ adsorber catalyst composition is present upstream of an SCR or SCRF™ catalyst, as under such conditions the SCR or SCRF™ catalyst will achieve quantitative $NO_x$ conversion. In addition, this low or absent $NO_x$ storage at temperatures in excess of 180, 200, 250 or 300° C., preferably about 300° C., means that there will be no $NO_x$ stored when the vehicle is subsequently used under relatively cold conditions, e.g. under "city" conditions, which has the further advantage of reducing $NO_x$ slippage under such cold conditions.

In some embodiments, the neodymium-containing component contains a characteristic Raman shift compared to an equivalent material that does not contain neodymium. In one embodiment, wherein the neodymium-containing component is neodymium-doped ceria, the characteristic Raman shift is at 462 $cm^{-1}$, compared to 465 $cm^{-1}$ for the undoped ceria material. In such embodiments, there is also a characteristic increase in intensity of a Raman band at 560 $cm^{-1}$ compared to the undoped material.

The neodymium-containing component may be characterised in that it has a crystallite size, as measured by X-ray diffraction, that is lower than in an equivalent material that does not contain neodymium. In one embodiment, wherein the neodymium-containing component is neodymium-doped ceria, the crystallite size of the neodymium-containing component may be less than about 6.5 nm, e.g. 6.2 to 6.8 nm, preferably about 6.4 nm, compared to a crystal size of more than about 7.5 nm, e.g. 7.5 to 8.5 nm, preferably about 8.0 nm, for the undoped material. Without wishing to be bound by theory, it is believed that the neodymium is incorporated into the lattice structure of the neodymium-containing component, e.g. neodymium-doped ceria.

The neodymium-containing component can be present in any amount, but is preferably present in an amount of about 0.5-18 mol %, more preferably about 1-16 mol % neodymium, still more preferably about 2-12 mol % neodymium, expressed as a mol % of Nd in the neodymium-containing component. For example, the neodymium-containing component may be present in about 0.5, 1, 2, 4, 6, 8, 10, 11, 12, 14, 16, or 18 mol %.

The neodymium-containing component preferably comprises about 0.5-20 wt %, more preferably about 2.5-18.5 wt % of neodymium, expressed as a wt % of Nd in the neodymium-containing component. If the $NO_x$ adsorber catalyst composition is present as a layer in a catalyst comprising a plurality of layers, the wt % refers to the amount of neodymium present in the $NO_x$ adsorber catalyst composition layer only.

The neodymium-containing component preferably comprises about 0.1-10 wt %, more preferably about 0.3-7.0 wt % of neodymium, expressed as a wt % of the $NO_x$ adsorber catalyst composition. If the $NO_x$ adsorber catalyst composition is present as a layer in a catalyst comprising a plurality of layers, the wt % refers to the amount of neodymium present in the $NO_x$ adsorber catalyst composition layer only.

The neodymium-containing component preferably comprises about 1.5-10.5 mol %, more preferably about 2.0-7.0% of neodymium, expressed as a mol % of the $NO_x$ adsorber catalyst composition. If the $NO_x$ adsorber catalyst composition is present as a layer in a catalyst comprising a plurality of layers, the mol % refers to the amount of neodymium present in the $NO_x$ adsorber catalyst composition layer only.

The support material comprises alumina or a mixed oxide or composite oxide thereof. Particularly preferred support materials include alumina, or a magnesia/alumina composite oxide or mixed oxide.

Preferred support materials preferably have a surface area in the range 10 to 1500 $m^2/g$, pore volumes in the range 0.1 to 4 mL/g, and pore diameters from about 10 to 1000 Angstroms. High surface area supports having a surface area greater than 80 $m^2/g$ are particularly preferred, e.g. high surface area alumina. Other preferred support materials include magnesia/alumina composite oxides, optionally further comprising a cerium-containing component, e.g. ceria. In such cases the ceria may be present on the surface of the magnesia/alumina composite oxide, e.g. as a coating.

The $NO_x$ storage material is selected from the group consisting of cerium oxide, a ceria-zirconia mixed oxide, and an alumina-ceria-zirconia mixed oxide. The $NO_x$ storage material comprises cerium oxide, e.g. preferably is cerium oxide. In some embodiments of the invention, the $NO_x$ storage material further comprises barium. It should be noted, however, that it is not necessary to include barium as a $NO_x$ storage material in compositions of the invention, i.e. barium is an optional component of compositions of the invention. In other words, some compositions of the invention are substantially free of barium.

Some compositions of the invention are therefore barium-free $NO_x$ adsorber compositions comprising a neodymium-containing component. In such compositions, the neodymium-containing component may function as a $NO_x$ storage material. In some barium-free $NO_x$ adsorber compositions of the invention, the neodymium-containing component is present as a dopant. That is, the barium-free $NO_x$ adsorber compositions may comprise a neodymium-doped support material, a neodymium-doped $NO_x$ storage material, or both a neodymium-doped support material and a neodymium-doped $NO_x$ storage material.

In preferred barium-free $NO_x$ adsorber compositions of the invention, the neodymium-containing component is neodymium-doped alumina, neodymium-doped ceria, or a neodymium-doped magnesia/alumina composite oxide.

Compositions of the invention that are substantially free of barium, or do not comprise barium as a $NO_x$ storage material (e.g. barium-free $NO_x$ adsorber compositions), may be particularly advantageous because they store less $NO_x$ at temperatures in excess of 180, 200, 250 or 300° C., preferably about 300° C. than a comparable barium-containing composition. In other words, compositions of the invention that are substantially free of barium, or do not comprise barium as a $NO_x$ storage material, have improved $NO_x$ release properties at temperatures in excess of 180, 200, 250 or 300° C., preferably about 300° C. than a comparable barium-containing composition. Such compositions may also have improved sulfur tolerance relative to an equivalent barium-containing composition. In this context, "improved sulfur tolerance" means that compositions of the invention that are substantially free of barium are either more resistant to sulfation, can be thermally desulfated at a lower temperature, or both, compared to an equivalent barium-containing composition.

In embodiments where the $NO_x$ storage material does comprise barium, a preferred $NO_x$ storage material is a $CeO_2$—$BaCO_3$ composite material. Such a material can be preformed by any method known in the art, for example incipient wetness impregnation or spray-drying. If the $NO_x$ adsorber catalyst composition contains barium, the $NO_x$ adsorber catalyst composition preferably comprises 0.1 to 10 weight percent barium, and more preferably 0.5 to 5 weight percent barium, e.g. about 4.5 weight percent barium, expressed as a weight % of the composition.

In some preferred NOx adsorber catalysts of the invention, the first layer is substantially free of alkali metals.

In some preferred NOx adsorber catalysts of the invention, the first layer is substantially free of rhodium, preferably contains no rhodium. In such $NO_x$ adsorber catalysts, the first layer comprises one or more platinum group metals disposed on the support material, wherein the one or more platinum group metals consist essentially of, preferably consist of, a mixture or alloy of platinum and palladium.

The one or more platinum group metals (PGM) are preferably selected from the group consisting of platinum, palladium, rhodium, or mixtures thereof. Platinum, palladium and mixtures thereof are particularly preferred, e.g. a mixture of platinum and palladium. The $NO_x$ adsorber catalyst composition preferably comprises 0.1 to 10 weight percent PGM, more preferably 0.5 to 5 weight percent PGM, and most preferably 1 to 3 weight percent PGM.

The $NO_x$ adsorber catalyst composition of the invention may comprise further components that are known to the skilled person. For example, the compositions of the invention may further comprise at least one binder and/or at least one surfactant. Where a binder is present, dispersible alumina binders are preferred.

The $NO_x$ adsorber catalyst composition of the present invention may be prepared by any suitable means. Preferably, the one or more platinum group metals, and/or neodymium-containing component, and/or $NO_x$ storage material are loaded onto the support by any known means to form the $NO_x$ adsorber catalyst composition. The manner of addition is not considered to be particularly critical. For example, a platinum group metal compound (such as platinum nitrate), a neodymium compound (such as neodymium nitrate), and a cerium compound (such as cerium nitrate, as a precursor to the ceria-containing material) may be supported on a support (such as an alumina) by impregnation, adsorption, ion-exchange, incipient wetness, precipitation, or the like, or by any other means commonly known in the art.

The order of addition of the platinum group metal (PGM), neodymium-containing component and/or $NO_x$ storage component to the support is not considered critical. For example, the PGM, neodymium-containing component and cerium compounds may be added to the support simultaneously, or may be added sequentially in any order.

A further aspect of the invention is a $NO_x$ adsorber catalyst comprising the $NO_x$ adsorber catalyst composition as hereinbefore described supported on a metal or ceramic substrate. The substrate may be a flow-through substrate or a filter substrate, but is preferably a flow-through monolith substrate.

The flow-through monolith substrate has a first face and a second face defining a longitudinal direction therebetween. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In an alternative embodiment of the invention, the $NO_x$ adsorber catalyst comprising the $NO_x$ adsorber catalyst composition as hereinbefore described is extruded to form a flow-through or filter substrate.

In embodiments wherein the $NO_x$ adsorber catalyst comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the $NO_x$ adsorber catalyst comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

Preferably, the $NO_x$ adsorber catalyst as hereinbefore described is prepared by depositing the $NO_x$ adsorber catalyst composition as hereinbefore described on the substrate using washcoat procedures. A representative process for preparing the $NO_x$ adsorber catalyst component using a washcoat procedure is set forth below. It will be understood that the process below can be varied according to different embodiments of the invention.

The washcoating is preferably performed by first slurrying finely divided particles of the $NO_x$ adsorber catalyst composition in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters, may also be incorporated in the slurry as a mixture of water soluble or water-dispersible compounds or complexes.

The substrate may then be coated one or more times with the slurry such that there will be deposited on the substrate the desired loading of the $NO_x$ adsorber catalyst composition.

Preferably, the $NO_x$ adsorber catalyst comprises a substrate and at least one layer on the substrate. In one embodiment, the at least one layer comprises the $NO_x$ adsorber catalyst composition as hereinbefore described. This can be produced by the washcoat procedure described above. One or more additional layers may be added to the one layer of $NO_x$ adsorber catalyst composition.

In embodiments wherein one or more additional layers are present (i.e. in addition to the $NO_x$ adsorber catalyst composition), the one or more additional layers have a different composition to the first layer comprising the $NO_x$ adsorber catalyst composition.

The one or more additional layers may comprise one zone or a plurality of zones, e.g. two or more zones. Where the one or more additional layers comprise a plurality of zones, the zones are preferably longitudinal zones. The plurality of zones, or each individual zone, may also be present as a gradient, i.e. a zone may not be of a uniform thickness along its entire length, to form a gradient. Alternatively a zone may be of uniform thickness along its entire length.

In some preferred embodiments, one additional layer, i.e. a second layer, is present.

Typically, the second layer comprises a platinum group metal (PGM) (referred to below as the "second platinum group metal"). It is generally preferred that the second layer comprises the second platinum group metal (PGM) as the only platinum group metal (i.e. there are no other PGM components present in the catalytic material, except for those specified).

The second PGM may be selected from the group consisting of platinum, palladium, and a combination or mixture of platinum (Pt) and palladium (Pd). Preferably, the platinum group metal is selected from the group consisting of palladium (Pd) and a combination or a mixture of platinum (Pt) and palladium (Pd). More preferably, the platinum group metal is selected from the group consisting of a combination or a mixture of platinum (Pt) and palladium (Pd).

It is generally preferred that the second layer is (i.e. is formulated) for the oxidation of carbon monoxide (CO) and/or hydrocarbons (HCs).

Preferably, the second layer comprises palladium (Pd) and optionally platinum (Pt) in a ratio by weight of 1:0 (e.g. Pd only) to 1:4 (this is equivalent to a ratio by weight of Pt:Pd of 4:1 to 0:1). More preferably, the second layer comprises platinum (Pt) and palladium (Pd) in a ratio by weight of <4:1, such as ≤3.5:1.

When the platinum group metal is a combination or mixture of platinum and palladium, then the second layer comprises platinum (Pt) and palladium (Pd) in a ratio by weight of 5:1 to 3.5:1, preferably 2.5:1 to 1:2.5, more preferably 1:1 to 2:1.

The second layer typically further comprises a support material (referred to herein below as the "second support material"). The second PGM is generally disposed or supported on the second support material.

The second support material is preferably a refractory oxide. It is preferred that the refractory oxide is selected from the group consisting of alumina, silica, ceria, silica alumina, ceria-alumina, ceria-zirconia and alumina-magnesium oxide. More preferably, the refractory oxide is selected from the group consisting of alumina, ceria, silica-alumina and ceria-zirconia. Even more preferably, the refractory oxide is alumina or silica-alumina, particularly silica-alumina.

A particularly preferred second layer comprises a silica-alumina support, platinum, palladium, barium, a molecular sieve, and a platinum group metal (PGM) on an alumina support, e.g. a rare earth-stabilised alumina. Particularly preferably, this preferred second layer comprises a first zone comprising a silica-alumina support, platinum, palladium, barium, a molecular sieve, and a second zone comprising a platinum group metal (PGM) on an alumina support, e.g. a rare earth-stabilised alumina. This preferred second layer may have activity as an oxidation catalyst, e.g. as a diesel oxidation catalyst (DOC).

A further preferred second layer comprises, consists of, or consists essentially of a platinum group metal on alumina This preferred second layer may have activity as an oxidation catalyst, e.g. as a $NO_2$-maker catalyst.

A further preferred second layer comprises a platinum group metal, rhodium, and a cerium-containing component.

In other preferred embodiments, more than one of the preferred second layers described above are present, in addition to the $NO_x$ adsorber catalyst composition. In such embodiments, the one or more additional layers may be present in any configuration, including zoned configurations.

The $NO_x$ adsorber catalyst composition may be disposed or supported on the second layer or the substrate (e.g. the plurality of inner surfaces of the through-flow monolith substrate), preferably the second layer is disposed or supported on the $NO_x$ adsorber catalyst composition.

The second layer may be disposed or supported on the substrate (e.g. the plurality of inner surfaces of the through-flow monolith substrate).

The second layer may be disposed or supported on the entire length of the substrate or the $NO_x$ adsorber catalyst composition. Alternatively the second layer may be disposed or supported on a portion, e.g. 5%, 10%, 20%, 30%, 40%, 50%, 60%, 70%, 80%, 90%, or 95%, of the substrate or the $NO_x$ adsorber catalyst composition.

Preferably, the entire length of the substrate is coated with the $NO_x$ adsorber catalyst composition.

A further aspect of the invention is a method of making the $NO_x$ adsorber catalyst composition as hereinbefore described, comprising adding one or more precious group metals or precious group metal salts to a support material to form a PGM-support mixture, and adding a $NO_x$ storage material to the PGM-support mixture. Preferred methods further comprise the step of forming a neodymium-containing support material. Other preferred methods further comprise the step of forming a neodymium-containing $NO_x$ storage material. Methods of the invention may comprise the step of forming a neodymium-containing support material and the step of forming a neodymium-containing $NO_x$ storage material. In some preferred methods, the neodymium-containing support material and/or the neodymium-containing $NO_x$ storage material is formed by incipient wetness impregnation.

The neodymium-containing $NO_x$ storage material, or the neodymium-containing support material, may be formed by spray-drying. A further aspect of the invention is a method of making a neodymium-containing material, comprising mixing a solution of a neodymium-containing salt with ceria particles, spray-drying the particles, and heating the spray-dried particles.

In preferred methods of the invention, the mixing of the neodymium-containing salt with ceria particles is carried out in a solvent, e.g. water.

In some preferred methods, the spray-drying of the particles is carried out with an inlet temperature of between 250 and 350° C., preferably between 280 and 320° C., particularly preferably about 300° C.

In some preferred methods, the spray-drying of the particles is carried out with an outlet temperature of between 80 and 150° C., preferably between 100 and 130° C., particularly preferably about 110° C.

In some preferred methods, the spray-dried powder is heated at a temperature of between 250 and 600° C., preferably between 400 and 550° C., particularly preferably about 500° C.

Some preferred methods comprise the additional step of drying the heated spray-dried powder at a temperature of between 600 and 800° C., preferably between 620 and 680° C., particularly preferably about 650° C.

Further preferred methods of the invention further comprise one or more additional steps, such as adding at least one binder and/or adding at least one surfactant.

A further aspect of the invention is a NOx adsorber catalyst for treating emissions from a lean burn engine, said NOx adsorber catalyst comprising a first layer, said first layer comprising a composition comprising:
  a support material;
  one or more platinum group metals disposed on the support material; and
  a NOx storage material;
  wherein the support material comprises alumina or a mixed oxide comprising alumina;
  the one or more platinum group metals comprise a mixture or alloy of platinum and palladium;
  the NOx storage material comprises ceria; and
  the support material or the NOx storage material is obtainable by the method as hereinbefore described. In other words, the NOx storage material is obtainable by mixing a solution of a neodymium-containing salt with ceria particles, spray-drying the particles, and heating the spray-dried particles.

A further aspect of the invention is an emission treatment system for treating a flow of a combustion exhaust gas that comprises the $NO_x$ adsorber catalyst as hereinbefore described and a lean-burn engine, wherein the lean-burn engine is in fluid communication with the $NO_x$ adsorber catalyst; and wherein the lean-burn engine is a diesel engine.

In preferred systems, the lean-burn engine is a light duty diesel engine. The $NO_x$ adsorber catalyst may be placed in a close-coupled position or in the underfloor position.

The emission treatment system typically further comprises an emissions control device.

The emissions control devices is preferably downstream of the $NO_x$ adsorber catalyst.

Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the emission treatment system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the emission treatment system of the invention comprises an SCR catalyst or an SCRF™ catalyst, then the emission treatment system may further comprise an injector for injecting a nitrogenous reductant, such as ammonia, or an ammonia precursor, such as urea or ammonium formate, preferably urea, into exhaust gas downstream of the $NO_x$ adsorber catalyst and upstream of the SCR catalyst or the SCRF™ catalyst.

Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas. Alternatively or in addition to the injector, ammonia can be generated in situ (e.g. during rich regeneration of a LNT disposed upstream of the SCR catalyst or the SCRF™ catalyst), e.g. a $NO_x$ adsorber catalyst comprising the $NO_x$ adsorber catalyst composition of the invention. Thus, the emission treatment system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the emission treatment system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first emission treatment system embodiment, the emission treatment system comprises the $NO_x$ adsorber catalyst of the invention and a catalysed soot filter (CSF). The $NO_x$ adsorber catalyst is typically followed by (e.g. is upstream of) the catalysed soot filter (CSF). Thus, for example, an outlet of the $NO_x$ adsorber catalyst is connected to an inlet of the catalysed soot filter.

A second emission treatment system embodiment relates to an emission treatment system comprising the $NO_x$ adsorber catalyst of the invention, a catalysed soot filter (CSF) and a selective catalytic reduction (SCR) catalyst.

The $NO_x$ adsorber catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third emission treatment system embodiment, the emission treatment system comprises the $NO_x$ adsorber catalyst of the invention, a selective catalytic reduction (SCR) catalyst and either a catalysed soot filter (CSF) or a diesel particulate filter (DPF).

In the third emission treatment system embodiment, the $NO_x$ adsorber catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the catalyzed monolith substrate may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth emission treatment system embodiment comprises the $NO_x$ adsorber catalyst of the invention and a selective catalytic reduction filter (SCRF™) catalyst. The $NO_x$ adsorber catalyst of the invention is typically followed by (e.g. is upstream of) the selective catalytic reduction filter (SCRF™) catalyst.

A nitrogenous reductant injector may be arranged between the $NO_x$ adsorber catalyst and the selective catalytic reduction filter (SCRF™) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

Another aspect of the invention relates to a vehicle. The vehicle comprises an internal combustion engine, preferably a diesel engine. The internal combustion engine preferably the diesel engine, is coupled to an emission treatment system of the invention.

It is preferred that the diesel engine is configured or adapted to run on fuel, preferably diesel fuel, comprises ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg. In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

A further aspect of the invention is a method of treating an exhaust gas from an internal combustion engine comprising contacting the exhaust gas with the $NO_x$ adsorber catalyst as hereinbefore described. In preferred methods, the exhaust gas is a rich gas mixture. In further preferred methods, the exhaust gas cycles between a rich gas mixture and a lean gas mixture.

In some preferred methods of treating an exhaust gas from an internal combustion engine, the exhaust gas is at a temperature of about 180 to 300° C.

In further preferred methods of treating an exhaust gas from an internal combustion engine, the exhaust gas is contacted with one or more further emissions control devices, in addition to the $NO_x$ adsorber catalyst as hereinbefore described. The emissions control device or devices is preferably downstream of the $NO_x$ adsorber catalyst.

Examples of a further emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the method comprises contacting the exhaust gas with an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the the method of the invention comprises contacting the exhaust gas with an SCR catalyst or an SCRF™ catalyst, then the method may further comprise the injection of a nitrogenous reductant, such as ammonia, or an ammonia precursor, such as urea or ammonium formate, preferably urea, into exhaust gas downstream of the $NO_x$ adsorber catalyst and upstream of the SCR catalyst or the SCRF™ catalyst.

Such an injection may be carried out by an injector. The injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the method may further comprise enriching of the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the method of treating an exhaust gas of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first embodiment, the method comprises contacting the exhaust gas with the $NO_x$ adsorber catalyst of the invention and a catalysed soot filter (CSF). The $NO_x$ adsorber catalyst is typically followed by (e.g. is upstream of) the catalysed soot filter (CSF). Thus, for example, an outlet of the $NO_x$ adsorber catalyst is connected to an inlet of the catalysed soot filter.

A second embodiment of the method of treating an exhaust gas relates to a method comprising contacting the exhaust gas with the $NO_x$ adsorber catalyst of the invention, a catalysed soot filter (CSF) and a selective catalytic reduction (SCR) catalyst.

The $NO_x$ adsorber catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third embodiment of the method of treating an exhaust gas, the method comprises contacting the exhaust gas with the $NO_x$ adsorber catalyst of the invention, a selective catalytic reduction (SCR) catalyst and either a catalysed soot filter (CSF) or a diesel particulate filter (DPF).

In the third embodiment of the method of treating an exhaust gas, the $NO_x$ adsorber catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth embodiment of the method of treating an exhaust gas comprises the $NO_x$ adsorber catalyst of the invention and a selective catalytic reduction filter (SCRF™) catalyst. The $NO_x$ adsorber catalyst of the invention is typically followed by (e.g. is upstream of) the selective catalytic reduction filter (SCRF™) catalyst.

A nitrogenous reductant injector may be arranged between the $NO_x$ adsorber catalyst and the selective catalytic reduction filter (SCRF™) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth method embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

A further aspect of the invention is the use of a neodymium-containing material to improve the low temperature $NO_x$ storage capacity of a $NO_x$ adsorber material, relative to an equivalent $NO_x$ adsorber material that does not contain the neodymium-containing material.

A still further aspect of the invention is the use of a neodymium-containing material to decrease the $NO_x$ storage capacity of a $NO_x$ adsorber material at a given temperature, relative to an equivalent NOx adsorber material that does not contain the neodymium-containing material. Preferably the given temperature is about 200° C., more preferably about 250° C., still more preferably about 280° C., particularly preferably about 300° C.

A still further aspect of the invention is the use of a neodymium-containing material to improve the sulfur tolerance of a $NO_x$ adsorber material, relative to an equivalent $NO_x$ adsorber material that does not contain the neodymium-containing material.

EXAMPLES

The invention will now be illustrated by the following non-limiting examples.
Methods
X-Ray diffraction data was determined using a Bruker AXS D8 diffractometer and a Lynxeye PSD detector. Cu Kα radiation was used, with a scan range of 10 to 130°2θ, 0.02° step size, in θ/θ coupled scan mode, at a tube voltage of 40 kV and current of 40 mA, at ambient temperature.
Materials
All materials are commercially available and were obtained from known suppliers, unless noted otherwise.
General Preparation (1)—[Ce.Nd]
$CeO_2$ powder is impregnated using a solution of neodymium(III) nitrate in water. The impregnated powder is then dried overnight at 110° C., followed by calcining at 650° C. for 1 hour.
General Preparation (2)—[$Al_2O_3$.Nd]
$Al_2O_3$ (boehmite) powder is impregnated using a solution of neodymium(III) nitrate in water. The impregnated powder is then dried overnight at 110° C., followed by calcining at 650° C. for 1 hour.
General Preparation (3)—Spray-Dried [Ce.Nd]
672 g $Nd(NO_3)_3$ was dissolved in 5281 g demineralized water. 2873 g of a high surface area $CeO_2$ was added in powder form and the mixture stirred for 30 minutes. The resulting slurry was spray-dried on a Spray Dryer in countercurrent mode (two-fluid, fountain nozzle, with inlet temperature set at 300° C. and outlet 110° C.). The resulting powder was collected from the cyclone.

The powder was calcined at 500° C. for 1 hour under a flow of air, followed by 650° C. for a further hour in a static oven.

EXAMPLE 1

Preparation of [$Al_2O_3$.Nd(13.0 wt %)].Pt.Pd.[Ce.Ba(7%)] (10.2 mol % $Al_2O_3$.Nd; 8.7 mol % Ce.Ba)

A $CeO_2$—$BaCO_3$ composite material is formed from barium acetate and high surface area ceria, followed by calcination at 650° C. for 1 hour.

1.77 g/in³ [$Al_2O_3$.Nd] (prepared according to general preparation (2) above) is made into a slurry with distilled water and then milled to a $d_{90}$ of 13-15 μm. To the slurry, 94 g/ft³ Pt malonate and 19 g/ft³ Pd nitrate solution is then added, and stirred until homogenous. The Pt/Pd is allowed to adsorb onto the [$Al_2O_3$.Nd] support for 1 hour.

To this is then added 3.33 g/in³ of the $CeO_2$—$BaCO_3$ composite material, followed by 0.2 g/in³ alumina binder, and stirred until homogenous to form a washcoat.

The washcoat is then coated onto a ceramic or metallic monolith using standard coating procedures, dried at 100° C. and calcined at 500° C. for 45 mins.

The Ba is present in about 4.3 wt % (4.6 mol %). The Nd is present in about 4.3 wt % (4.3 mol %).

EXAMPLE 2

Preparation of [$Al_2O_3$.Nd(0%)].Pt.Pd.[Ce.Ba(7 wt %)]

Prepared as in Example 1, but using $Al_2O_3$ instead of [$Al_2O_3$.Nd].

EXPERIMENTAL RESULTS

Catalysts Example 1 and Example 2 were hydrothermally aged at 800° C. for 5 h, in a gas stream consisting of 10% $H_2O$, 20% $O_2$, and balance $N_2$. They were performance tested over a simulated MVEG-B emissions cycle using a 1.6 litre bench mounted diesel engine. Emissions were measured pre- and post-catalyst. The cumulative $NO_x$ pollutant emissions are shown in FIG. 1. The difference between the engine out (pre-catalyst) $NO_x$ emissions and the post-catalyst $NO_x$ emissions indicates the amount of $NO_x$ removed on the catalyst. It can be seen from FIG. 1 that Example 1, which comprises a neodymium-containing component, has a larger capacity to adsorb $NO_x$ than Example 2, which does not comprise a neodymium-containing component

EXAMPLE 3

Preparation of $Al_2O_3$ PtPd [Ce.Ba(7 wt %)]

A $CeO_2$—$BaCO_3$ composite material is formed from barium acetate and high surface area ceria, followed by calcination at 650° C. for 1 hour.

1.5 g/in³ $Al_2O_3$ is made into a slurry with distilled water and then milled to a $d_{90}$ of 13-15 μm. To the slurry, 94 g/ft³ Pt malonate and 19 g/ft³ Pd nitrate solution is then added, and stirred until homogenous. The Pt/Pd is allowed to adsorb onto the $Al_2O_3$ support for 1 hour.

To this is then added 3.27 g/in³ of the $CeO_2$—$BaCO_3$ composite material, followed by 0.2 g/in³ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 59.6 wt % (48.7 mol %). The Ba is present at a loading of about 4.6 wt % (4.7 mol %).

EXAMPLE 4

Preparation of [$Al_2O_3$.Nd(7.08 wt %)] PtPd [Ce.Ba(7 wt %)] (5.3 mol % $Al_2O_3$.Nd; 8.7 mol % Ce.Ba)

Prepared as in Example 3, but using [$Al_2O_3$.Nd] (prepared according to general preparation (2) above).

The Ce is present at a loading of about 47.2 wt % (48.2 mol %). The Nd is present at a loading of about 2.2 wt % (2.2 mol %). The Ba is present at a loading of about 4.5 wt % (4.6 mol %).

EXAMPLE 5

Preparation of [$Al_2O_3$.Nd(13.0 wt %)].Pt.Pd.[Ce.Ba(7%)] (10.2 mol % $Al_2O_3$.Nd; 8.7 mol % Ce.Ba)

Prepared as in Example 3, but using [$Al_2O_3$.Nd] (prepared according to general preparation (2) above).

The Ce is present at a loading of about 46 wt %(47.6 mol %). The Nd is present at a loading of about 4.3 wt % (4.3 mol %). The Ba is present at a loading of about 4.3 wt % (4.6 mol %).

EXAMPLE 6

Preparation of [$Al_2O_3$.Nd(18.2 wt %)] PtPd [Ce.Ba(7 wt %)] (15.1 mol % $Al_2O_3$.Nd; 8.7 mol % Ce.Ba)

Prepared as in Example 3, but using [$Al_2O_3$.Nd] (prepared according to general preparation (2) above).

The Ce is present at a loading of about 44.9 wt % (47.1 mol %). The Nd is present at a loading of about 6.4 wt % (6.5 mol %). The Ba is present at a loading of about 400 g/ft$^3$.

EXPERIMENTAL RESULTS

Core samples were taken from each of the catalysts of Examples 3-6. The cores were pre-conditioned by heating in a ramp to 400° C. in a gas mixture comprising 6% $CO_2$, 12% $O_2$ and balance $N_2$, followed by seven cycles of lean-rich preconditioning using the gas mixtures shown below in Table 1 (in each case the balance is nitrogen). The cycles were 120 seconds lean/10 seconds rich, at a space velocity (SV) of 40,000 h$^{-1}$.

TABLE 1

|  | Lean | Rich |
| --- | --- | --- |
| $O_2$ (%) | 12 | 0.9 |
| $CO_2$ (%) | 6 | 10 |
| $H_2O$ (%) | 6 | 12 |
| NO (ppm) | 200 | 100 |
| $C_3H_6$ (ppm as $C_1$) | 500 | 3000 |
| CO (ppm) | 1500 | 21000 |
| $H_2$ (ppm) | — | 7500 |

Catalytic activity was determined using a synthetic gas bench test. The cores were tested in a simulated catalyst activity testing (SCAT) gas apparatus using the inlet gas mixture in Table 1. The test consisted of six cycles of 300 seconds lean/16 seconds rich.

Results

The results from one representative cycle of the SCAT test at low SV (40,000 h$^{-1}$) at 200° C. are shown in Table 2 below.

TABLE 2

| | $NO_x$ concentration (ppm) | | | |
| --- | --- | --- | --- | --- |
| Time (seconds) | Example 3 | Example 4 | Example 5 | Example 6 |
| 1350 | 25 | 23 | 14 | 40 |
| 1450 | 51 | 48 | 43 | 75 |
| 1550 | 68 | 66 | 59 | 90 |
| 1650* | 14 | 15 | 8 | 23 |

*after rich event

The results from one representative cycle of the SCAT test at high SV (80,000 h$^{-1}$) at 400° C. are shown in Table 3 below.

TABLE 3

| | $NO_x$ concentration (ppm) | | | |
| --- | --- | --- | --- | --- |
| Time (seconds) | Example 3 | Example 4 | Example 5 | Example 6 |
| 1350 | 128 | 103 | 77 | 102 |
| 1450 | 182 | 184 | 179 | 184 |
| 1550 | 185 | 196 | 189 | 191 |
| 1650* | 93 | 76 | 50 | 75 |

*after rich event

It can be seen from Table 2 that Examples 4 and 5, having 200 and 400 g/ft$^3$ Nd respectively, both result in lower $NO_x$ concentration at the catalyst outlet than Example 3, which contains no Nd. Conversely, it can be seen that Example 6, having 600 g/ft$^3$ Nd, shows more $NO_x$ slip (i.e. higher catalyst output $NO_x$ concentration) than any of Examples 2, 3, and 4, suggesting that too high a loading of Nd is detrimental to $NO_x$ adsorber performance.

EXAMPLE 7

Preparation of "$Al_2O_3$ Ref"

1.5 g/in$^3$ $Al_2O_3$ is made into a slurry with distilled water and then milled to a d$_{90}$ of 13-15 µm. To the slurry, 94 g/ft$^3$ Pt malonate and 19 g/ft$^3$ Pd nitrate solution is then added, and stirred until homogenous. The Pt/Pd is allowed to adsorb onto the $Al_2O_3$ support for 1 hour.

To this is then added 3 g/in$^3$ of high surface area Ce and 0.2 g/in$^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.9 wt % (51.1 mol %).

EXAMPLE 8

Preparation of [$Al_2O_3$.Nd(7.1 wt %)] PGM Ce.5.3 mol % $Al_2O_3$.Nd

Prepared as in Example 7, but using [$Al_2O_3$.Nd] (prepared according to general preparation (2) above).

The Ce is present at a loading of about 50.5 wt % (50.5 mol %). The Nd is present at a loading of about 2.4 wt % (2.3 mol %).

EXAMPLE 9

Preparation of [$Al_2O_3$.Nd(13.0 wt %)] PGM Ce.(10.2 mol % $Al_2O_3$.Nd)

Prepared as in Example 7, but using [$Al_2O_3$.Nd] (prepared according to general preparation (2) above).

The Ce is present at a loading of about 49.1 wt % (49.9 mol %). The Nd is present at a loading of about 4.6 wt % (4.6 mol %).

EXAMPLE 10

Preparation of [$Al_2O_3$.Nd(18.2 wt %)] PGM Ce.(15.1 mol % $Al_2O_3$.Nd)

Prepared as in Example 7, but using [$Al_2O_3$.Nd] (prepared according to general preparation (2) above).

The Ce is present at a loading of about 47.8 wt % (49.4 mol %). The Nd is present at a loading of about 6.8 wt % (6.8 mol %).

EXPERIMENTAL RESULTS

Core samples were taken from each of the catalysts of Examples 7-10. The cores were pre-conditioned by heating in a ramp to 600° C. in a gas mixture comprising 6% $CO_2$, 12% $O_2$, 6% $H_2O$ and balance $N_2$.

Catalytic activity was determined using a synthetic gas bench test. The cores were tested in a simulated catalyst activity testing (SCAT) gas apparatus using the inlet gas mixture in Table 4. The test consisted of five cycles of 300 seconds lean/16 seconds rich, at a space velocity (SV) of 40,000 $h^{-1}$.

TABLE 4

|  | Lean | Rich |
|---|---|---|
| $O_2$ (%) | 12 | 0.9 |
| $CO_2$ (%) | 6 | 10 |
| $H_2O$ (%) | 6 | 12 |
| NO (ppm) | 200 | 200 |
| $C_3H_6$ (ppm as $C_1$) | 500 | 3000 |
| CO (ppm) | 1500 | 21000 |
| $H_2$ (ppm) | — | 7500 |

Results

The results from one representative cycle of the SCAT test at 200° C. are shown in Table 5 below.

TABLE 5

| | $NO_x$ concentration (ppm) | | | |
|---|---|---|---|---|
| Time (seconds) | Example 7 | Example 8 | Example 9 | Example 10 |
| 975 | 76 | 10 | 10 | 12 |
| 1075 | 166 | 117 | 63 | 30 |
| 1175 | 169 | 136 | 88 | 55 |
| 1275* | 31 | 12 | 14 | 14 |

*after rich event

It can be seen from Table 5 that each of Examples 8, 9 and 10, having 200, 400 and 600 g/ft³ Nd respectively, result in lower $NO_x$ concentration at the catalyst outlet than Example 7, which contains no Nd.

Each of the catalysts of Examples 8-10 do not comprise a further ceria-containing component. Thus by comparison to the catalysts of Examples 4-7 above, which do each comprise a further ceria-containing component, it can be seen that the improved $NO_x$ adsorber performance shown in each of Tables 3 and 5 can be attributed to the presence of a neodymium-containing component.

EXAMPLE 11

Preparation of "Ce Ref"

1.54 g/in³ 10% Ce on 20% MgO/$Al_2O_3$ Spinel is made into a slurry with distilled water and then milled to a $d_{90}$ of 13-15 µm. To the slurry, 94 g/ft³ Pt malonate and 19 g/ft³ Pd nitrate solution is then added, and stirred until homogenous. The Pt/Pd is allowed to adsorb onto the $CeO_2$ support for 1 hour.

To this is then added 3 g/in³ of high surface area Ce and 0.2 g/in³ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 54.2 wt % (49.0 mol %).

EXAMPLE 12

Preparation of 10% Ce on 20% MgO/$Al_2O_3$ Spinel (10.1 wt % Ce) PGM.[$CeO_2$.Nd(3.7 wt %)] 4.5 mol % Ce.Nd Prepared as in Example 11, but using [$CeO_2$.Nd] (prepared according to general preparation (1) above).

The Ce is present at a loading of about 53.2 wt % (48.9 mol %). The Nd is present at a loading of about 2.4 wt % (2.1 mol %).

EXAMPLE 13

Preparation of 10% Ce on 20% MgO/$Al_2O_3$ Spinel (10.1 wt % Ce) PGM.[$CeO_2$Nd(7.0 wt %)] (8.72 mol % $CeO_2$.Nd)

Prepared as in Example 11, but using [$CeO_2$.Nd] (prepared according to general preparation (1) above).

The Ce is present at a loading of about 51.8 wt % (48.1 mol %). The Nd is present at a loading of about 4.6 wt % (4.1 mol %).

EXAMPLE 14

Preparation of 10% Ce on 20% MgO/$Al_2O_3$ Spinel (10.1 wt % Ce) PGM.[$CeO_2$.Nd(10.2 wt %)] (12.9 mol % $CeO_2$.Nd)

Prepared as in Example 11, but using [$CeO_2$.Nd] (prepared according to general preparation (1) above).

The Ce is present at a loading of about 50.4 wt % (47.6 mol %). The Nd is present at a loading of about 6.7 wt % (6.2 mol %).

EXPERIMENTAL RESULTS

Core samples were taken from each of the catalysts of Examples 11-14. The cores were pre-conditioned by heating in a ramp to 600° C. in a gas mixture comprising 6% $CO_2$, 12% $O_2$, 6% $H_2O$ and balance $N_2$.

Catalytic activity was determined using a synthetic gas bench test. The cores were tested in a simulated catalyst activity testing (SCAT) gas apparatus using the inlet gas mixture in Table 6. The test consisted of five cycles of 300 seconds lean/16 seconds rich, at a space velocity (SV) of 40,000 $h^{-1}$.

TABLE 6

|  | Lean | Rich |
|---|---|---|
| $O_2$ (%) | 12 | 0.9 |
| $CO_2$ (%) | 6 | 10 |
| $H_2O$ (%) | 6 | 12 |
| NO (ppm) | 200 | 200 |
| $C_3H_6$ (ppm as $C_1$) | 500 | 3000 |
| CO (ppm) | 1500 | 21000 |
| $H_2$ (ppm) | — | 7500 |

Results

The results from one representative cycle of the SCAT test at 200° C. are shown in Table 7 below.

TABLE 7

| | $NO_x$ concentration (ppm) | | | |
|---|---|---|---|---|
| Time (seconds) | Example 11 | Example 12 | Example 13 | Example 14 |
| 975 | 65 | 12 | 9 | 8 |
| 1075 | 152 | 110 | 58 | 30 |
| 1175 | 158 | 128 | 85 | 61 |
| 1275* | 31 | 13 | 15 | 14 |

*after rich event

Discussion of results in Table 7

EXAMPLE 15

Preparation of 10% Ce on 20% $MgO/Al_2O_3$ Spinel (10.1 wt % Ce) PGM Ce 1.54 $g/in^3$ 10% Ce on 20% $MgO/Al_2O_3$ Spinel is made into a slurry with distilled water and then milled to a $d_{90}$ of 13-15 μm. To the slurry, 94 $g/ft^3$ Pt malonate and 19 $g/ft^3$ Pd nitrate solution is then added, and stirred until homogenous. The Pt/Pd is allowed to adsorb onto the 10% Ce on 20% $MgO/Al_2O_3$ Spinel support for 1 hour.

To this is then added 3 g/in of ceria, followed by 0.2 $g/in^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 54.1 wt % (49.0 mol %).

EXAMPLE 16

Preparation of 10% Ce on 20% $MgO/Al_2O_3$ Spinel (10.1 wt % Ce) PGM [Ce.Ba(2.8 wt %)]) (3.5 mol % Ce.Ba)

A $CeO_2$—$BaCO_3$ composite material is formed from barium acetate and high surface area ceria, followed by calcination at 650° C. for 1 hour.

1.54 $g/in^3$ 10% Ce on 20% $MgO/Al_2O_3$ Spinel is made into a slurry with distilled water and then milled to a $d_{90}$ of 13-15 μm. To the slurry, 94 $g/ft^3$ Pt malonate and 19 $g/ft^3$ Pd nitrate solution is then added, and stirred until homogenous. The Pt/Pd is allowed to adsorb onto the 10% Ce on 20% $MgO/Al_2O_3$ Spinel support for 1 hour.

To this is then added 3.13 g/in of $CeO_2$—$BaCO_3$ composite material, followed by 0.2 $g/in^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 53.3 wt % (48.3 mol %). The Ba is present at a loading of about 1.8 wt % (1.6 mol %).

EXAMPLE 17

Preparation of 10% Ce on 20% $MgO/Al_2O_3$ Spinel (10.1 wt % Ce) PGM [Ce.Ba(7 wt %)] (8.7 mol % Ce.Ba)

A $CeO_2$—$BaCO_3$ composite material is formed from barium acetate and high surface area ceria, followed by calcination at 650° C. for 1 hour.

1.54 $g/in^3$ 10% Ce on 20% $MgO/Al_2O_3$ Spinel is made into a slurry with distilled water and then milled to a $d_{90}$ of 13-15 μm. To the slurry, 94 $g/ft^3$ Pt malonate and 19 $g/ft^3$ Pd nitrate solution is then added, and stirred until homogenous. The Pt/Pd is allowed to adsorb onto the 10% Ce on 20% $MgO/Al_2O_3$ Spinel support for 1 hour.

To this is then added 3.33 $g/in$ of $CeO_2$—$BaCO_3$ composite material, followed by 0.2 $g/in^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.2 wt % (47 mol %). The Ba is present at a loading of about 4.5 wt % (4.2 mol %).

EXAMPLE 18

Preparation of 10% Ce on 20% $MgO/Al_2O_3$ Spinel (10.1 wt % Ce) PGM [Ce. Nd(7 wt %)] (8.7 mol % Ce.Nd)

1.54 $g/in^3$ 10% Ce on 20% $MgO/Al_2O_3$ Spinel is made into a slurry with distilled water and then milled to a $d_{90}$ of 13-15 μm. To the slurry, 94 $g/ft^3$ Pt malonate and 19 $g/ft^3$ Pd nitrate solution is then added, and stirred until homogenous. The Pt/Pd is allowed to adsorb onto the 10% Ce on 20% $MgO/Al_2O_3$ Spinel support for 1 hour.

To this is then added 3.27 $g/in^3$ of [Ce.Nd] (prepared according to general procedure (1) above), followed by 0.2 $g/in^3$ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.8 wt % (48.3 mol %). The Nd is present at a loading of about 4.6 wt % (4.1 mol %).

EXPERIMENTAL RESULTS

Core samples were taken from each of the catalysts of Examples 15-18. The cores were sulfated to 2 g/L sulfur by heating at 350° C. in a gas mixture comprising 8% $H_2O$, 14% $O_2$, 35 ppm $SO_2$ and balance $N_2$, at a space velocity (SV) of 45,000 $h^{-1}$.

Desulfation activity was determined using a synthetic gas bench test. The cores were tested in a simulated catalyst activity testing (SCAT) gas apparatus using the inlet gas mixture in Table 8 over a 20° C./min temperature ramp from 120 to 650° C. at a space velocity (SV) of 45,000 $h^{-1}$. $H_2S$ and $SO_2$ release was measured by mass spectrometry, and the results are shown in Table 9.

TABLE 8

| | |
|---|---|
| $O_2$ (%) | 0.98 |
| $CO_2$ (%) | 13.24 |
| $H_2O$ (%) | 10 |
| $C_3H_6$ (ppm as $C_1$) | 3373 |
| CO (ppm) | 21200 |
| $H_2$ (%) | 0.64 |

TABLE 9

| | $DeSO_x$ efficiency (%)* | | | |
|---|---|---|---|---|
| Temperature (° C.) | Example 15 | Example 16 | Example 17 | Example 18 |
| 400 | 15 | 20 | 18 | 19 |
| 450 | 54 | 56 | 49 | 59 |
| 500 | 81 | 76 | 69 | 84 |
| 550 | 89 | 82 | 76 | 91 |
| 600 | 92 | 84 | 81 | 93 |

*normalized to 2.3 g/L loading

It can be seen from Table 9 that Example 18, comprising 400 g/ft³ Nd, undergoes more efficient desulfation at a given temperature than any of Examples 15-17, which do not comprise a neodymium-containing component. Notably, Example 18 shows improved desulfation efficiency relative to Example 15, comprising undoped cerium, and to Examples 16-17, comprising 150 and 400 g/ft³ Ba, respectively. This is particularly apparent at the 450 and 500° C. data points shown in Table 9 above.

An alternative representation of the $DeSO_x$ efficiency data obtained as described above is shown in Table 10.

TABLE 10

| $DeSO_x$ Efficiency (%) | Temperature to achieve $DeSO_x$ efficiency (° C.) | | | |
|---|---|---|---|---|
| | Example 15 | Example 16 | Example 17 | Example 18 |
| 50 | 440 | 437 | 448 | 436 |
| 60 | 455 | 451 | 466 | 448 |
| 70 | 470 | 472 | 495 | 461 |
| 80 | 488 | 506 | 562 | 478 |
| 90 | 531 | n/a* | n/a* | 516 |

*90% sulfur removal not achieved

From Table 10 it can be seen that Example 18, comprising 400 g/ft³ Nd, achieves a given % of $DeSO_x$ efficiency at a lower temperature than each of Examples 15-17, which do not comprise a neodymium-containing component. Neither of Examples 16 or 17, comprising 140 and 400 g/ft³ Ba respectively, achieved 90% sulfur removal, whereas Example 18 achieved 90% sulfur removal at 516° C.—lower than Example 15 comprising undoped ceria.

It can therefore be seen from Table 9 and Table 10 that the catalysts comprising a neodymium-containing component can be more easily desulfated, i.e. at lower temperatures (or with higher efficiency at a given temperature) than the catalysts that do not comprise a neodymium-containing component.

EXAMPLE 19

Preparation of $Al_2O_3$ PGM Ce 1.5 g/in³ $Al_2O_3$ is made into a slurry with distilled water and then milled to a $d_{90}$ of 13-15 μm. To the slurry, 94 g/ft³ Pt malonate and 19 g/ft³ Pd nitrate solution is then added, and stirred until homogenous. The Pt/Pd is allowed to adsorb onto the $Al_2O_3$ support for 1 hour.

To this is then added 3 g/in³ high surface area ceria and 0.2 g/in³ alumina binder, and stirred until homogenous to form a washcoat.

The washcoat is then coated onto a ceramic or metallic monolith using standard procedures, dried at 100° C. and calcined at 500° C. for 45 mins.

The Ce is present at a loading of about 51.9 wt % (51.1 mol %).

EXAMPLE 20

Preparation of [$Al_2O_3$.Nd(13.0 wt %)] PGM Ce (10.2 mol % $Al_2O_3$.Nd)

Prepared as in Example 19, but using [$Al_2O_3$.Nd] (prepared according to general preparation (2) above).

The Ce is present at a loading of about 49.1 wt % (49.9 mol %) The Nd is present at a loading of about 4.6 wt % (4.6 mol %).

EXAMPLE 21

Preparation of [$Al_2O_3$.Nd(18.2 wt %)] PGM Ce (15.1 mol % $Al_2O_3$.Nd)

Prepared as in Example 19, but using [$Al_2O_3$.Nd] (prepared according to general preparation (2) above).

The Ce is present at a loading of about 47.8 wt % (49.4 mol %) The Nd is present at a loading of about 6.8 wt % (6.8 mol %).

EXAMPLE 22

Preparation of [$Al_2O_3$.Nd(26.7 wt %)] PGM Ce (24.1 mol % $Al_2O_3$.Nd)

Prepared as in Example 19, but using [$Al_2O_3$.Nd] (prepared according to general preparation (2) above).

The Ce is present at a loading of about 45.4 wt % (48.3 mol %) The Nd is present at a loading of about 10.8 wt % (11.1 mol %).

EXPERIMENTAL RESULTS

Catalytic activity was determined using a synthetic gas bench test. The cores were tested in a simulated catalyst activity testing (SCAT) gas apparatus using the inlet gas mixture in Table 11. The test consisted of five cycles of 300 seconds lean/16 seconds rich, at a space velocity (SV) of 40,000 $h^{-1}$.

TABLE 11

|  | Lean | Rich |
|---|---|---|
| $O_2$ (%) | 12 | 0.9 |
| $CO_2$ (%) | 6 | 10 |
| $H_2O$ (%) | 6 | 12 |
| NO (ppm) | 200 | 100 |
| $C_3H_6$ (ppm as $C_1$) | 500 | 3000 |
| CO (ppm) | 1500 | 21000 |
| $H_2$ (ppm) | — | 7500 |

Results

The results from one representative cycle of the SCAT test are shown in Table 12 below.

TABLE 12

| | $NO_x$ conversion (%) | | | |
|---|---|---|---|---|
| Temperature (° C.) | Example 19 | Example 20 | Example 21 | Example 22 |
| 150 | 0 | 0 | 3 | 0 |
| 175 | 0 | 15 | 34 | 24 |
| 200 | 15 | 43 | 47 | 35 |
| 250 | 46 | 65 | 73 | 68 |

From Table 12 it can be seen that each of Examples 20 and 21, comprising 400 and 600 g/ft³ Nd, respectively, show increased $NO_x$ conversion in the 150-250° C. range compared to Example 19, which does not comprise a neodymium-containing component. It can also be seen that Example 22, comprising 1000 g/ft³ Nd, is less effective at $NO_x$ conversion in this temperature range than Examples 20 and 21, despite the higher loading of Nd compared to these two Examples. This is consistent with the results shown in Table 2 above, which also indicate that too high a loading of a neodymium-containing component may be detrimental to $NO_x$ adsorber catalyst performance.

X-ray Diffraction Data

TABLE 13

| Sample | Phase | Crystal System | Space Group | Crystallite size LVol-IB (nm) | Lattice Parameter a (Å) |
|---|---|---|---|---|---|
| Pt/CeO₂ | CeO₂ | FCC | Fm-3m (225) | 8.0(1) | 5.4106(2) |
| Pt/10Nd/CeO₂ | 'CeO₂' | FCC | Fm-3m (225) | 6.4(1) | 5.4176(4) |

X-ray diffraction data was collected as described above. It can be seen from Table 13 that the composition comprising neodymium has a crystallite size that is lower than in an equivalent material that does not contain neodymium. Without wishing to be bound by theory, it is believed that the neodymium is incorporated into the lattice structure of the neodymium-containing component, e.g. neodymium-doped ceria.

It can also be seen that the Lattice Parameter in the neodymium-containing sample increases relative to the sample that does not contain neodymium.

The invention claimed is:

1. An emissions treatment system for treating a flow of a combustion exhaust gas that comprises a $NO_x$ adsorber catalyst in fluid communication with a lean burn engine, wherein the lean-burn engine is a diesel engine, and wherein the $NO_x$ adsorber catalyst has a first layer comprising:
    a mixture or alloy of platinum and palladium on a support containing alumina or a composite or mixed oxide containing alumina; and
    a $NO_x$ storage material consisting of neodymium-doped ceria; and
    wherein the $NO_x$ adsorber catalyst is deposited directly on a metal or ceramic substrate.

2. The emissions treatment system as claimed in claim 1, wherein the neodymium-doped ceria comprises about 0.5-18 mol % neodymium.

3. The emissions treatment system as claimed in claim 1, wherein the support material is alumina, or a magnesia/alumina composite oxide or mixed oxide.

4. The emissions treatment system of claim 1, wherein the first layer is substantially free of rhodium.

5. The emissions treatment system of claim 1, wherein the first layer is substantially free of alkali metals.

6. The emissions treatment system of claim 1, wherein the substrate is a flow-through monolith or a filter monolith.

7. The emissions treatment system of claim 4, wherein the first layer contains no rhodium.

8. The emissions treatment system of claim 1, further comprising an emissions control device downstream of the $NO_x$ adsorber catalyst.

9. The emissions treatment system of claim 8, wherein the emissions control device is selected from a diesel particulate filter (DPF), a lean NOx trap (LNT), a lean NOx catalyst (LNC), a selective catalytic reduction (SCR) catalyst, a diesel oxidation catalyst (DOC), a catalysed soot filter (CSF), a selective catalytic reduction filter (SCRF™) catalyst, or an ammonia slip catalyst (ASC).

10. The emissions treatment system of claim 8, wherein the emissions control device is a selective catalytic reduction (SCR) catalyst or a selective catalytic reduction filter (SCRF™) catalyst.

11. The emissions treatment system of claim 10, further comprising an injector for injecting a nitrogenous reductant into exhaust gas downstream of the NOx adsorber catalyst and upstream of the SCR catalyst or the selective catalytic reduction filter (SCRF™) catalyst.

\* \* \* \* \*